US010516352B2

(12) United States Patent
Dremel et al.

(10) Patent No.: US 10,516,352 B2
(45) Date of Patent: Dec. 24, 2019

(54) BRUSHLESS ELECTRIC MOTOR

(71) Applicant: Brose Fahrzeugteile GmbH & Co. Kommanditgesellschaft, Bamberg, Bamberg (DE)

(72) Inventors: Benedikt Dremel, Stegaurach (DE); Michael Morgenroth, Zapfendorf (DE); Benedikt Nagler, Ahorn (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 15/922,342

(22) Filed: Mar. 15, 2018

(65) Prior Publication Data

US 2018/0269813 A1 Sep. 20, 2018

(30) Foreign Application Priority Data

Mar. 15, 2017 (DE) ........................ 10 2017 204 331

(51) Int. Cl.

| | |
|---|---|
| ***H02P 6/24*** | (2006.01) |
| ***H02P 6/08*** | (2016.01) |
| ***H02P 6/34*** | (2016.01) |
| ***H02P 29/032*** | (2016.01) |
| ***F16H 61/32*** | (2006.01) |
| *H02H 7/125* | (2006.01) |

(52) U.S. Cl.

CPC ............. *H02P 6/085* (2013.01); *F16H 61/32* (2013.01); *H02P 6/24* (2013.01); *H02P 6/34* (2016.02); *H02P 29/032* (2016.02); *F16D 2500/1023* (2013.01); *F16D 2500/3028* (2013.01); *H02H 7/125* (2013.01)

(58) Field of Classification Search

CPC ...... H02P 6/14; H02P 6/16; H02P 6/18; H02P 6/24; H02P 6/21; H02P 6/183; G01R 31/42; G01R 31/007; G01R 31/025

See application file for complete search history.

(56) References Cited

U.S. PATENT DOCUMENTS

| | | | | |
|---|---|---|---|---|
| 6,330,140 | B1 * | 12/2001 | Wilson-Jones | G01R 31/007 324/527 |
| 6,603,277 | B2 * | 8/2003 | Yoshimura | H02P 6/24 318/139 |
| 8,054,017 | B2 * | 11/2011 | Baba | H02P 6/21 318/400.11 |
| 8,768,675 | B2 * | 7/2014 | Bracker | G05F 1/625 703/13 |

(Continued)

FOREIGN PATENT DOCUMENTS

DE 10 2014 202 771 A1 8/2015

*Primary Examiner* — Rina I Duda

(74) *Attorney, Agent, or Firm* — Muncy, Geissler, Olds & Lowe, P.C.

(57) ABSTRACT

A brushless electric motor of a motor vehicle, in particular an ancillary unit, including a first phase winding, which is connected in series to a first semiconductor switch, and including a second phase winding, which is connected in series to a second semiconductor switch. The brushless electric motor includes a test circuit, which is connected in parallel to the first semiconductor switch and the second semiconductor switch. A method is also provided for operating a brushless electric motor, and also provided is a drive train actuator of a motor vehicle.

13 Claims, 3 Drawing Sheets

Legend
34 - first bridge branch
36 - second bridge branch
38 - third bridge branch
65 - ohmic resistor
68 - terminal
70 - microprocessor
76 - first resistor
80 - third resistor
90 - fourth resistor
96 - fifth resistor

(56) References Cited

U.S. PATENT DOCUMENTS

| | | | | |
|---|---|---|---|---|
| 2010/0060213 | A1* | 3/2010 | Hasegawa | H02P 6/14 318/400.04 |
| 2010/0060222 | A1* | 3/2010 | Kezobo | G01R 31/42 318/490 |
| 2013/0342146 | A1* | 12/2013 | Lawrence | H02P 6/183 318/400.33 |
| 2015/0214882 | A1* | 7/2015 | Suzuki | B62D 5/046 318/139 |
| 2017/0070169 | A1 | 3/2017 | Altendorf et al. | |

* cited by examiner

Legend
4 - internal combustion engine
8 - transmission
12 - drive wheels
14 - brushless electric motor
16 - drive train actuator

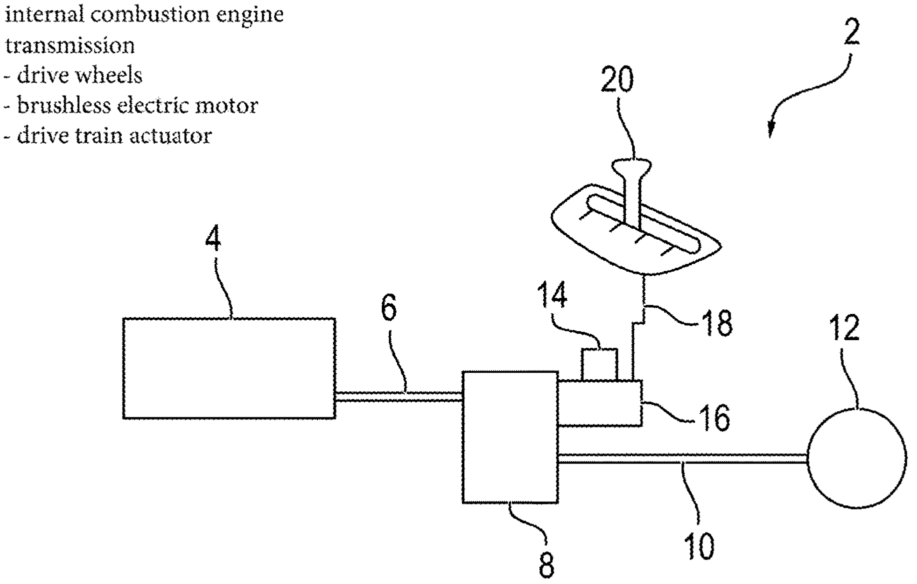

FIG. 1

Legend
24 - 1st phase winding
26 - 2nd phase winding
28 - 3rd phase winding
40 - 1st semiconductor switch
42-1st aux semiconductor switch
44 -2nd semiconductor switch
46 - 2nd aux semiconductor switch
48 - 3rd semiconductor switch
50 - 3rd aux semiconductor switch
56 - test circuit
58 - 4th semiconductor switch
60 - 5th semiconductor switch
62 - 6th semiconductor switch
64 - detection circuit

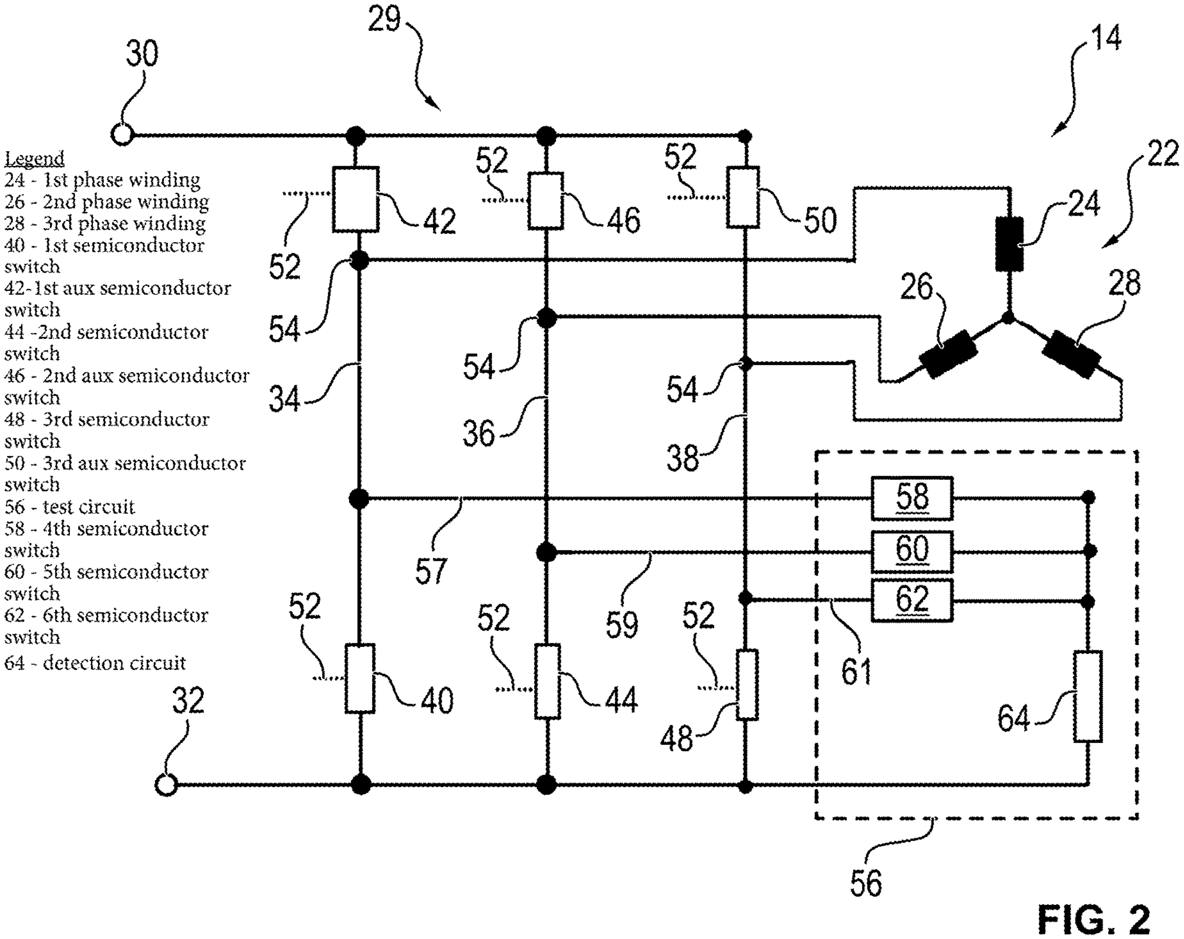

FIG. 2

BRUSHLESS ELECTRIC MOTOR

This nonprovisional application claims priority under 35 U.S.C. § 119(a) to German Patent Application No. 10 2017 204 331.8, which was filed in Germany on Mar. 15, 2017, and which is herein incorporated by reference.

BACKGROUND OF THE INVENTION

Field of the Invention

The invention relates to a brushless electric motor of a motor vehicle as well as a method for operating a brushless electric motor of a motor vehicle. The brushless electric motor can be part of an ancillary unit of the motor vehicle, such as a drive train actuator. The invention furthermore relates to a drive train actuator of a motor vehicle.

Description of the Background Art

In at least partially automated transmissions of a motor vehicle, the individual gears are set with the aid of a drive train actuator. The drive train actuator has a so-called shift finger and an electric motor, the shift finger being adjustable by the electric motor, and the position of the shift finger determining the desired gear ratio. A brushless electric motor, whose stator is energized with the aid of an electronic system, is usually used as the electric motor. The electronic system includes a number of semiconductor components, which are connected in a bridge circuit. The bridge circuit is conventionally a three-phase bridge circuit, and the stator has three field windings, which are connected to each other in either a delta or a star circuit with the aid of an interconnecting ring. To shield and avoid possible damage to the field windings, each of which includes a number of electric coils, the stator is disposed in a stator housing.

The semiconductor elements are activated as a function of an electric current flowing over the semiconductor components, provided that a field-oriented regulation is used. To monitor the power of the electric motor and to identify a possible fault, it is also necessary for the electric current flow to be detected by the electric coils. For example, a magnetic field is detected for this purpose, which surrounds the conductors carrying the electric current. A more cost-effective variant is to use a so-called shunt. An ohmic resistor is connected in series to the electric coil, and the electric voltage falling over the resistor is detected. The electric current is ascertained based on the ohmic resistance, on the basis of the known resistance value and the detected electric voltage. The disadvantage here is that another component, namely the shunt, must be introduced into the current path, which results in an increased complexity during manufacturing. Additional components are also required, which increases the manufacturing costs.

SUMMARY OF THE INVENTION

It is therefore an object of the invention to provide a particularly suitable brushless electric motor of a motor vehicle as well as a particularly suitable method for operating a brushless electric motor as well as a particularly suitable drive train actuator of an electric machine, a size and/or manufacturing costs, in particular, being reduced.

In an exemplary embodiment, the brushless electric motor can be part of a motor vehicle. For example, the electric motor is used to drive the motor vehicle, which is thus, in particular, an electric vehicle or a hybrid vehicle. However, the brushless electric motor can be part of an ancillary unit of the motor vehicle, for example an adjusting drive, such as a steering motor of a so-called power steering system. The adjusting drive is part of the motor vehicle and has an adjusting part and a drive unit. The adjusting drive is, for example, an electromotive seat adjuster, an electromotively operated side window or an electromotively operated sunroof. In this case, the adjusting part is a seat, a part of a seat, a window pane or the sunroof. In one alternative, the adjusting drive is an electromotively operated door, and the adjusting part is the door. Alternatively, the adjusting device is an electromotively operated rear hatch. In other words, the rear hatch as the adjusting part is swiveled into an opened and/or closed position with the aid of the drive unit. In other alternatives, the brushless electric motor is part of an air conditioning compressor, a heater fan (HVAC) or a pump, for example a water pump or a lubricant pump, such as a transmission oil or motor oil pump. In a preferred specific embodiment, the brushless electric motor actuates a component of an at least partially automated transmission of a motor vehicle. In other words, the electric motor is part of a drive train actuator (DTA).

The brushless electric motor is advantageously a synchronous machine and preferably a brushless DC motor (BLDC). The brushless electric motor includes a first phase winding and a second phase winding, which is made, for example, from an enameled wire, such as an enameled copper wire or an enameled aluminum wire. In particular, each of the phase windings includes a number of electric coils, which are connected in series to each other. In other words, each phase winding includes a number of electric coils, which are each part of an electromagnet. The number of electric coils of the two phase windings is advantageously the same. In particular, the phase windings are each part of a stator of the brushless electric motor, and the brushless electric motor includes a rotor having a number of permanent magnets.

The first phase winding is connected in series to a first semiconductor, and the second phase winding is connected in series to a second semiconductor. The first phase winding is advantageously energized when the first semiconductor switch is actuated. Likewise, the second phase winding is energized by actuating the second semiconductor switch. The two semiconductor switches are, for example, field effect transistors and advantageously MOSFETs. In particular, the two semiconductor switches are part of an electronic system of the brushless electric motor. For example, the first phase winding is electrically contacted directly with the first semiconductor switch. In another alternative, additional electric and/or electronic components are electrically disposed between the first phase winding and the first semiconductor switch. Alternatively or combined therewith, the second phase winding is electrically contacted directly with the second semiconductor switch. In another alternative, additional electric and/or electronic components are electrically disposed between the second phase winding and the second semiconductor switch.

The brushless electric motor also includes a test circuit, which is connected in parallel to the first semiconductor switch and connected in parallel to the second semiconductor switch. The test circuit is used to detect an electric current, with the aid of which the particular phase winding (phase) is energized. In other words, the electric current is detected, which is carried by the first phase winding or the second phase winding during operation (phase current). In summary, the test circuit is used to measure the phase current and is particularly suitable for this purpose and is advantageously provided and configured.

An electric current which is present over the first semiconductor switch or the second semiconductor switch is suitably detected with the aid of the test circuit. The test circuit advantageously includes a voltage measuring device (voltmeter) for this purpose. The electric voltage which falls over the first semiconductor circuit when the latter is carrying current is suitably detected during operation. Alternatively or particularly preferably combined therewith, the electric voltage is detected which falls over the second semiconductor switch when the second semiconductor switch is carrying current. It is possible to determine the particular phase current based on the inner resistance of the particular semiconductor switch and the detected electric voltage. In summary, the phase current conducted by the particular semiconductor switch is detected with the aid of the test circuit, which is connected in parallel to the two semiconductors. In particular, the inner resistance of the particular semiconductor switch is used to determine the electric current flowing through the particular semiconductor switch, for which purpose the electric voltage present at the particular semiconductor switch is advantageously detected and/or employed/used.

Due to the determination of the electric current with the aid of the inner resistance of the two semiconductor switches, an additional measuring resistor, such as a shunt, is not necessary, which reduces installation space and manufacturing costs. In addition, only a single test circuit is used to detect the electric current carried by the particular semiconductor switch, which further reduces installation space and manufacturing costs. In particular, the brushless electric motor is provided with a shuntless design.

The first semiconductor switch and the second semiconductor switch are advantageously fed back to a shared reference potential. In other words, a terminal of the two semiconductor switches is electrically contacted with the reference potential and has this potential during operation. The terminal which is not electrically contacted with the particular phase winding is suitably the one fed back to the reference potential. In other words, the particular phase winding is fed back to the reference potential when the particular semiconductor switch is actuated. When the semiconductor switches are open, on the other hand, the particular phase winding is disconnected from the reference potential. In summary, the particular semiconductor switch on the side opposite the particular phase winding is fed back to the reference potential. Due to the feedback to the shared reference potential, it is necessary only to also feed the test circuit back to the shared reference potential for the purpose of parallel-connecting the latter. A connection complexity is reduced in this way, and the test circuit may be spatially disposed at a certain distance from the semiconductor switches.

The reference potential is particularly preferably ground. This is provided, for example, with the aid of a housing of the electric motor, or the electric motor includes, for example, a shared terminal which is advantageously electrically contacted with a body of the motor vehicle and has, for example, the same potential as the vehicle body. Due to the feedback to the shared reference potential—in particular, due to the use of ground as the reference potential—a cabling complexity is reduced and an interconnection simplified.

For example, the electric motor includes only the two phase windings. In particular, the two semiconductor switches are part of a bridge circuit, which is advantageously designed as a rectifier bridge circuit. The brushless electric motor has a two-phase structure in this case. However, the brushless electric motor preferably includes a third phase winding, which is connected in series to a third semiconductor switch. The test circuit is connected in parallel to the third semiconductor switch. In other words, the brushless electric motor has an at least three-phase structure, and it is possible to ascertain the phase current with respect to each of the phases with the aid of the test circuit. In particular, the phase windings are all of the same design, and/or the semiconductor switches are connected in a bridge circuit, which is advantageously designed as a three-phase bridge circuit. The phase windings are, in particular, electrically offset by 120° with respect to each other, and/or connected to each other in a delta or star circuit.

A torque curve of the electric motor is equalized on the basis of the third phase winding, the shared test circuit being used to determine the three phase currents. The semiconductor switches are suitably of the same design with respect to each other and preferably have at least the same inner resistance. For example, the phase windings have the same design. The third semiconductor switch is preferably also fed back to the shared reference potential, provided that the first and second semiconductor switches are fed back to the shared reference potential. In another alternative, the brushless electric motor includes a fourth, fifth, sixth or more phase windings, the phase windings being advantageously electrically offset by an angle corresponding to 360°, divided by the number of phase windings. Each of the phase windings is advantageously connected in series to one semiconductor switch, the test circuit being preferably connected in parallel to the particular semiconductor switch.

The test circuit advantageously includes a first branch having a fourth semiconductor switch and a second branch having a fifth semiconductor switch. The first branch is fed back to the second branch and they consequently electrically contact each other. The fourth semiconductor switch and the fifth semiconductor switch are advantageously field effect transistors, for example MOSFETs. The semiconductor switches of the branches have, in particular, a maximum current carrying capacity which is reduced with respect to the first semiconductor switch or the second semiconductor switch, which further reduces manufacturing costs.

The test circuit furthermore includes a detection circuit, and the first semiconductor switch is bridged with the aid of the first branch and the detection circuit. The second semiconductor switch is bridged with the aid of the second branch and the detection circuit. In particular, the detection circuit is connected in series to the first branch. The detection circuit is also connected in series to the second branch. The detection circuit is thus suitably fed back to the first branch and to the second branch, in particular in the area, i.e. at the electric potential, in which the first branch is fed back to the second branch. The first branch itself is suitably fed back to the input of the first semiconductor switch, which is electrically contacted with the first phase winding. The second branch is fed back, in particular, to the input of the second semiconductor switch, which is electrically contacted with the second phase winding. In particular, a series circuit is created from the first branch and the detection circuit, which is connected in parallel to the first semiconductor switch. Likewise, a series circuit is created from the second branch and the detection circuit, which is connected in parallel to the second semiconductor switch.

An electric voltage is thus applied to the detection circuit by actuating the fourth semiconductor switch, or an electric current flow through the detection circuit is generated. The electric voltage present at the detection circuit essentially corresponds to the voltage falling over the first semiconductor switch. Likewise, the electric voltage which falls over the second semiconductor switch may be applied to the detection switch with the aid of the fifth semiconductor switch.

The fourth and fifth semiconductor switches are advantageously activated in such a way that only one of these switches is carrying electric current.

The first semiconductor switch and the second semiconductor switch are advantageously fed back to the shared reference potential, and the detection circuit is also fed back to the reference potential on the side opposite the two branches, which simplifies an interconnection. For example, the third phase winding is present, and the test circuit includes a third branch, which is fed back to the first and second branches and includes a sixth semiconductor switch, the third semiconductor switch being bridged with the aid of the third branch and the detection circuit. In other words, the series circuit formed from the third branch and the detection circuit is connected in parallel to the third semiconductor switch. The sixth semiconductor switch is advantageously a field effect transistor and preferably a MOSFET. For example, the test circuit includes other components, in particular if the two semiconductor switches are not fed back to the shared reference potential. These components are suitably used to bridge the particular semiconductor switch and are advantageously disposed on the side of the detection circuit opposite the two branches.

For example, the detection circuit can include an operational amplifier having an input and an output. The input of the operational amplifier is fed back to the first branch and to the second branch. The electric potential present at the input of the operational amplifier may thus be set by actuating the fourth or fifth semiconductor switch. The detection circuit advantageously includes only a single operational amplifier, the electric potential/electric voltage present at the input of the operational amplifier being set with the aid of the fourth and fifth semiconductor switches. As a result, manufacturing costs and a necessary installation space are further reduced.

The output of the operational amplifier can be electrically contacted with a voltmeter. The first and second semiconductor switches are suitably fed back to the reference potential, and the voltmeter is connected between the output of the operational amplifier and the reference potential. An amplification of the electric voltage falling over the first or second semiconductor switch thus takes place with the aid of the operational amplifier, so that a comparatively cost-effective voltmeter may be used.

For example, a voltage limiter can be connected in parallel to the operational amplifier, in particular to the series circuit formed from the operational amplifier and the possible voltmeter. In other words, the voltage limiter is fed back to the input of the operation amplifier, which is fed back to the first and second branches. The series circuit formed from the operational amplifier and the voltmeter is suitably bridged with the aid of the voltage limiter. A maximum electric voltage present at the operational amplifier/voltmeter is limited with the aid of the voltage limiter. In particular, a short-circuiting takes place if the falling electric voltage exceeds a limiting value. As a result, the selection of a comparatively high amplification factor for the operational amplifier is made possible, so that even comparatively low electric voltages are detectable, which are present over the first or second semiconductor switch. If the fourth semiconductor switch is actuated, for example due to a malfunction, when the first semiconductor switch is not carrying current, and a comparatively high electric voltage is thus present thereat, the latter is compensated for with the aid of the voltage limiter, so that a damage to the operational amplifier and the voltmeter is ruled out. The voltage limiter is advantageously a zener diode (Z diode). The breakdown voltage is advantageously set to a maximum electric voltage present at the operational amplifier.

Alternatively or in combination therewith, a capacitor can be connected in parallel to the operational amplifier, in particular to the series circuit of the operational amplifier as well as the possible voltmeter. A filtering of the electric voltage present the operational amplifier takes place with the aid of the capacitor, so that comparably high frequency portions of the electric voltage are filtered out, and the voltage value detected with the aid of the voltmeter is thus subject to comparatively slight fluctuations. The input of the operational amplifier, which is fed back to the two branches, is advantageously the non-inverted input (plus input) of the operational amplifier. In particular, the operational amplifier is operated as a non-inverted amplifier. The output of the operational amplifier is electrically contacted with the aid of a parallel circuit of two resistors, a center tap between the two resistors being electrically contacted with the inverted input (minus input). The electric potential present at the output is advantageously detected with the aid of the voltmeter.

The first branch can include an ohmic resistor, which is, in particular, connected in series to the fourth semiconductor switch. In particular, the fourth semiconductor switch is situated between the resistor and the second branch. Alternatively or in combination therewith, the second branch includes an ohmic resistor, which is, in particular, connected in series to the fifth semiconductor switch. The fifth semiconductor switch is advantageously situated between the ohmic resistor and the first branch. Due to the two ohmic resistors or the particular ohmic resistor, a limiting of the electric current conducted with the aid of the particular branch takes place, for which reason a comparatively low electric current is conducted during operation with the aid of the test circuit. As a result, an electric loss occurring during operation is reduced. The third branch, if present, also suitably includes an ohmic resistor.

For example, a gate of the fourth semiconductor switch is electrically contacted with a gate of the first semiconductor switch. The fourth semiconductor switch is thus, in particular, electrically conductively connected when the first semiconductor switch is electrically conductively connected. Alternatively or in combination therewith, a gate of the fifth semiconductor switch is electrically contacted with a gate of the second semiconductor switch. Thus, the fifth semiconductor switch is electrically conductively connected whenever the second semiconductor switch is electrically conductively connected. An additional activation circuit for the fourth semiconductor switch or the fifth semiconductor switch is therefore not necessary, which simplifies the interconnection and further reduces manufacturing costs.

In an alternative, the gate of the fourth semiconductor switch or the gate of the fifth semiconductor switch can be electrically contacted with a microprocessor, so that the fourth semiconductor switch or the fifth semiconductor switch is controlled with the aid of the microprocessor. As a result, a flexibility of the test circuit is increased, and certain points in time are selectable, at which the electric voltage present over the first or second semiconductor switch and thus the electric current flowing over the particular semiconductor switch are detected. In another alternative, the gates of the fourth semiconductor switch and the fifth semiconductor switch, respectively, are fed back to a shift register, the gates being electrically contacted with different outputs of the shift register. The shift register is pulsed, for example, as a function of an activation of the first or second semiconductor switch. Due to the shift register, the fourth semiconductor switch and the fifth semiconductor switch are activated successively in time, other outputs, for example, being present between the outputs of the shift register, with the aid of which the two gates are electrically contacted.

The method for operating the brushless electric motor provides that the fourth semiconductor switch can be actuated only when the first semiconductor switch is carrying current. The fourth semiconductor switch is suitably electrically conductive if only the first semiconductor switch is carrying current. As a result, the electric voltage is present at the detection circuit only when the first semiconductor switch is carrying current. Alternatively or preferably in combination therewith, the fifth semiconductor switch is actuated only when the second semiconductor switch is carrying current. The fifth semiconductor switch is preferably electrically conductive if only the second semiconductor switch is carrying current. If the first and second semiconductor switches are carrying current, the fourth semiconductor switch and the fifth semiconductor switch are advantageously not carrying current, for example due to an overlap area. Only the particular phase current is therefore detected with the aid of the detection circuit. In another alternative, the two semiconductor switches, or at least one of the semiconductor switches, is carrying current when the first semiconductor switch or the second semiconductor switch or the first semiconductor switch and the second semiconductor switch is/are carrying electric current.

The drive train actuator of the motor vehicle can be used to select a certain gear ratio of a transmission of the motor vehicle, a main drive machine of the motor vehicle, in particular an internal combustion engine, being operatively connected to drive wheels of the motor vehicle via the transmission. For example, a so-called shift finger is drive by at least one electric motor, with the aid of which the individual gears of the transmission are set. For example, the drive train actuator includes two electric motors, the shift movement being carried out with the aid of one of these motors and the movement for selecting the so-called shift gate being carried out with the aid of the other one. A switching between a forward movement and a backward movement of the motor vehicle is advantageously carried out with the aid of the electric motor. Alternatively or in combination therewith, a clutch is actuated by the electric motor.

The electric motor is a brushless electric motor, for example a brushless DC motor (BLDC). The brushless electric motor includes a first phase winding, which is connected in series to a first semiconductor switch, and a second phase winding, which is connected in series to a second semiconductor switch. The brushless electric motor also includes a test circuit, which is connected in parallel to the first semiconductor switch and the second semiconductor switch. A detection of an electric voltage present at the particular semiconductor switch advantageously takes place during operation with the aid of the test circuit. An electric current carried by the particular semiconductor switch is determined with the assistance of a known (inner) resistance of the semiconductor switch. As a result, no additional resistor is needed for measuring current, and only one test circuit is used for this purpose, for which reason installation space and manufacturing costs are reduced.

The advantages and refinement specified in connection with the brushless electric motor/method are to be similarly transferred to the drive train actuator and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a schematically simplified view of a drive train of a motor vehicle;

FIG. 2 shows a schematic view of the electric motor, including a test circuit;

DETAILED DESCRIPTION

Figure 3:
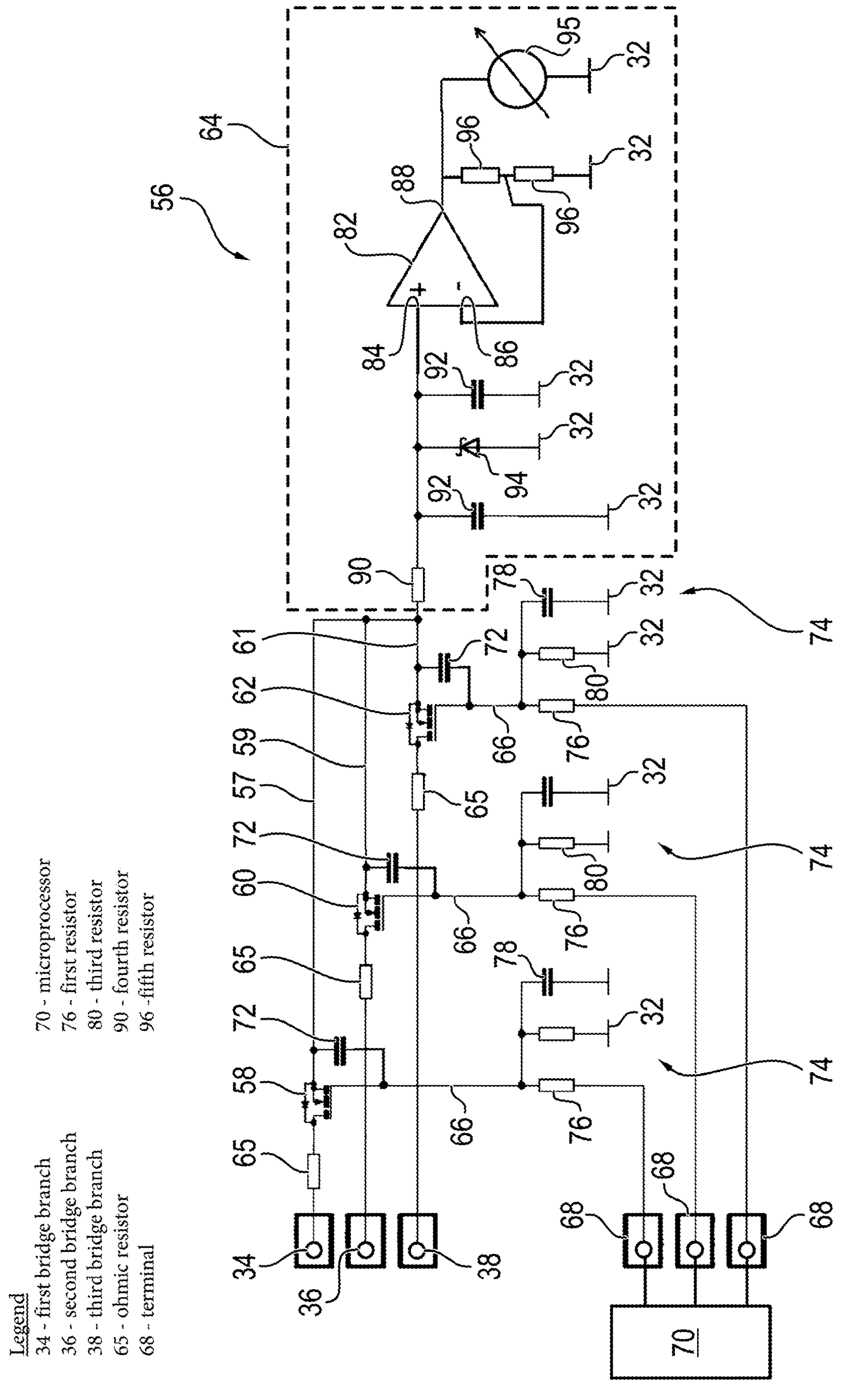
FIG. 3 shows a schematic view of the test circuit.

A simplified view of a drive train 2 of a motor vehicle is illustrated in FIG. 1. An internal combustion engine 4 is operatively connected to drive wheels 12 via a first shaft 6, a transmission 8, a second shaft 10 and a differential, which is not illustrated. The rotational movement of first shaft 6, which is driven directly by internal combustion engine 4, is converted into a rotational movement of drive wheels 12, both the rotation direction and the rotation speed of the two shafts being different. Due to the differential, the rotational movement of drive wheels 12 is essentially perpendicular to the rotational movement of second shaft 10.

A certain gear ratio between first shaft 6 and second shaft 10 is determined with the aid of transmission 8. The rotation direction of second shaft 10 is furthermore set with the aid of transmission 8. Transmission 8 has a number of so-called gears for this purpose, which are selected with the aid of a drive train actuator 16, which includes a brushless electric motor 14. Electric motor 14 drives an adjusting part of drive train actuator 16 for this purpose, which, in turn, is operatively connected to a selection mechanism of transmission 8. Gear train actuator 16 also includes a control electronic system, not illustrated, which controls electric motor 14 and which is set by a gear selector lever 20 via a data line 18. Data line 18 is a CAN bus, and a driver may select the movement direction of the motor vehicle with the aid of gear selector lever 20.

FIG. 2 shows a schematically simplified view of brushless electric motor 14, which includes a stator 22 having a first phase winding 24, a second phase winding 26 and a third phase winding 28, which are contacted with each other in a star circuit. Electric motor 14 also includes a converter 29, whose one terminal is electrically contacted with a vehicle system potential 30 of 12 volts or 48 voltage and whose second terminal is electrically contacted with ground 32. Converter 29 includes a three-phase bridge circuit having a first bridge branch 34, a second bridge branch 36 and a third bridge branch 38, which are connected in parallel to each other and are electrically contacted with vehicle system potential 30 and ground 32. First bridge branch 34 includes a first semiconductor switch 40 and a first auxiliary semiconductor switch 42, second bridge branch 36 includes a second semiconductor switch 44 and a second auxiliary semiconductor switch 46, and third bridge branch 38 includes a third semiconductor switch 48 and a third auxiliary semiconductor switch 50. Semiconductor switches 40, 44, 48 and particular auxiliary semiconductor switches 42, 46, 50 are of the same design and contacted with each other in a series circuit, so that converter 29 includes six semiconductor switches 40, 42, 44, 46, 48, 50 of the same design, each of which is a MOSFET and consequently have a gate 52. Particular semiconductor switches or auxiliary semiconductor switches 40, 42, 44, 46, 48, 50 are placed in an electrically conductive or electrically non-conductive state as a function of the electric voltage present at gate 52.

A terminal 54, with which one of phase windings 24, 26 and 28 is electrically contacted, is present between each of semiconductor switches 40, 44, 48 and particular assigned auxiliary semiconductor switch 42, 46, 50 of the same bridge branch 34, 36, 38. First phase winding 24 is electrically contacted with terminal 54 of first bridge branch 34, second phase winding 26 is electrically contacted with terminal 54 of second bridge branch 36 and third phase winding 28 is electrically contacted with terminal 54 of third bridge branch 38, so that first semiconductor switch 40 is connected in series to first phase winding 24, second semiconductor switch 44 is connected in series to second phase winding 26 and third semiconductor switch 48 is connected in series to third phase winding 28. First semiconductor switch 40, second semiconductor switch 44 and third semiconductor switch 48 are fed back to ground, so that the latter forms a shared reference potential. Semiconductor switches 40, 44, 48 are positioned between ground 32 and particular phase winding 24, 26, 28.

Brushless electric motor 14 furthermore includes a test circuit 56, which includes a first branch 57 having a fourth semiconductor switch 58, a second branch 59 having a fifth semiconductor switch 60, a third branch 61 having a sixth semiconductor switch 62 and a detection circuit 64. First branch 57 is electrically contacted with first bridge branch 34 between terminal 54 and first semiconductor switch 40, second branch 59 is electrically contacted with second bridge branch 36 between terminal 54 and second semiconductor switch 44, and third branch 61 is electrically contacted with third bridge branch 38 between terminal 54 and third semiconductor switch 48, so that the terminal of fourth semiconductor switch 58 essentially has the electric potential of terminal 54 of first bridge branch 34, the terminal of fifth semiconductor switch 60 essentially has the electric potential of terminal 54 of second bridge branch 36, and the terminal of the sixth semiconductor switch essentially has the electric potential of terminal 54 of third bridge branch 38.

Branches 57, 59, 61 are furthermore fed back to the detection circuit and thus to each other. Detection circuit 64 is fed back to ground 32 via its additional terminal. First semiconductor switch 40 is thus bridged with the aid of the series circuit of first branch 57 and detection circuit 64, second semiconductor switch 44 is bridged with the aid of second branch 59 and detection circuit 64, and third semiconductor switch 48 is bridged with the aid of third branch 61 and detection circuit 64. Test circuit 56 is also connected in parallel to first semiconductor switch 40, second semiconductor switch 44 and third semiconductor switch 48.

Test circuit 56 having three branches 57, 59, 61, which are provided with the same design, is illustrated in greater detail in FIG. 3. Thus, each of three branches 57, 59, 61 includes an ohmic resistor 65, which is connected between particular bridge branch 34, 36, 38 and particular semiconductor switch 58, 60, 62. Each of these semiconductor switches 58, 60, 62 has a gate 66, each of which is electrically contacted with a terminal 68. A microprocessor 70 is electrically contacted with each of these terminals 68, so that semiconductor switches 58, 60, 62 may be placed in the electrically conductive or electrically non-conductive state with the aid of microprocessor 70. Each of gates 66 is furthermore electrically contacted with particular branch 57, 59, 61 on the side of particular semiconductor switch 58, 60, 62 opposite ohmic resistor 65 with the aid of a first capacitor 72. The electric voltage present at particular gate 66 is stabilized with the aid of first capacitor 72. Each gate 66 is furthermore assigned a filter network 74, which is connected in parallel to a first resistor 76, via which particular gate 66 is electrically contacted with terminal 68. Each filter network 74 includes a second capacitor 78 and a third resistor 80, which are guided in parallel to each other and fed back to ground 32. The remaining terminals are electrically contacted with particular gate 66. Filter network 74 is used to eliminate high frequency and low frequency portions of an electric voltage provided at gate 66 via terminal 68.

The three branches 57, 59, 61 are fed back to detection circuit 64, which includes an operational amplifier 82 having a non-inverted input 84, an inverted input 86 and an output 88. Non-inverted input 84 is fed back to three branches 57, 59, 61 via a fourth resistor 90. Ohmic resistors 65 and fourth resistor 90 are used to limit the electric current conducted to non-inverted input 84. Non-inverted input 84 is also fed back to ground 32 via a parallel circuit comprising two capacitors 92. Capacitors 92 are used for filtering, for which reason the electric voltage present at non-inverted input 84 has only low frequency portions. In addition, non-inverted input 84 is fed back to ground 32 via a zener diode 94, the non-conducting direction being oriented toward non-inverted input 84, so that the excess electric voltage is discharged to ground 32 via zener diode 94 only upon exceeding an electric voltage present at non-inverted input 84 which is higher than the breakdown voltage of zener diode 94.

Output 88 of operational amplifier 82 is electrically contacted with a voltmeter 95, which is also fed back to ground 32 as the shared reference potential of first, second and third semiconductor switches 40, 44, 48. Output 88 is also fed back to ground 32 via a series circuit comprising two fifth resistors 96, the center tap being electrically contacted with inverted input 86 of the operational amplifier. Operational amplifier 82 is therefore operated as a non-inverted amplifier.

It is thus possible to detect the electric voltage falling over first semiconductor switch 40, second semiconductor switch 44 or third semiconductor switch 48 with the aid of voltmeter 95 upon the actuation of fourth semiconductor switch 58, fifth semiconductor switch 60 or sixth semiconductor switch 62. A limiting of the electric current flowing through test circuit 56 takes place with the aid of ohmic resistor 65 as well as fourth resistor 90, and the electric voltage is amplified with the aid of operational amplifier 82. This amplified electric voltage is detected with the aid of voltmeter 95. The electric current carried by particular semiconductor switch 40, 44, 48 is determined with the aid of Ohm's Law R=U/I on the basis of the known inner resistance of first, second or third semiconductor switch 40, 44, 48. A damage to operational amplifier 82 is prevented with the aid of zener diode 94, if a comparatively high electric voltage is present over particular semiconductor switch 40, 44, 48 because the latter is in the electrically non-conducting state.

In one specific embodiment, which is not illustrated in greater detail, gate 66 of fourth semiconductor switch 58 is electrically contacted with gate 52 of first semiconductor switch 40, gate 66 of fifth semiconductor switch 60 is electrically contacted with gate 52 of second semiconductor switch 44, and gate 66 of sixth semiconductor switch 62 is electrically contacted with gate 52 of third semiconductor switch 48, so that fourth, fifth or sixth semiconductor switch 58, 60, 62 is also activated upon the activation of first, second or third semiconductor switch 40, 44, 48. As a result, microprocessor 70 is not necessary or at least does not have to provide a function of this type for activating fourth, fifth or sixth semiconductor switch 58, 60, 62.

Figure 4:
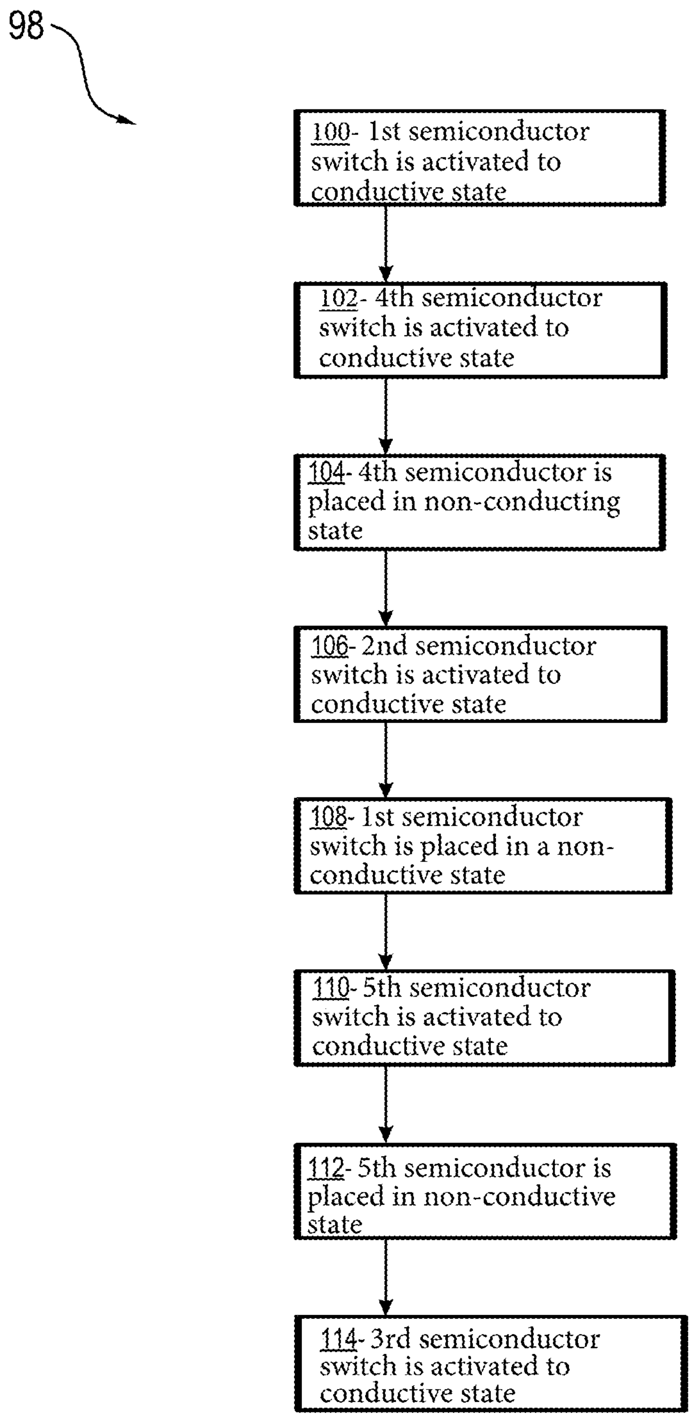
FIG. 4 shows a method for operating the electric motor.

FIG. 4 shows a method 98 for operating brushless electric motor 14. In a first work step 100, first semiconductor switch 40 is actuated and a current flow therethrough is generated. Fourth, fifth and sixth semiconductor switches 58, 60, 62 as well as second and third semiconductor switches 44, 48 are in an electrically non-conductive state. For example, third auxiliary semiconductor switch 50 is also carrying current, so that a current flow through third phase winding 28 as well as through first phase winding 24 is generated. In a subsequent second work step 102, fourth semiconductor switch 58 is placed in the electrically conductive state, and thus electric voltage falling over first semiconductor switch 40 is detected with the aid of voltmeter 95. The current flowing over the first semiconductor switch, and thus the phase current, is determined with the aid of another electronic system or microprocessor 70 with the assistance of the known inner resistance of first semiconductor switch 40.

In a subsequent third work step 104, an activation of fourth semiconductor switch 58 takes place, again with the aid of microprocessor 70, so that the fourth semiconductor switch is again placed in the non-conducting state. For this purpose, a suitable electric voltage is applied to gate 66 of fourth semiconductor switch 58 via terminal 68. In a subsequent fourth work step 106, second semiconductor switch 44 is actuated. For example, first auxiliary semiconductor switch 42 and/or third auxiliary semiconductor switch 50 is/are also actuated. As a result, both first semiconductor switch 40 and second semiconductor switch 44 are carrying current. A fifth work step 108 is essentially carried out immediately thereafter, in which first semiconductor switch 40 is activated in such a way that it is placed in the electrically non-conductive state. As a result, the electric current commutates only to second semiconductor switch 44.

A sixth work step 110 is subsequently carried out, and fifth semiconductor switch 60 is placed in the electrically conductive state. As a result, an electric potential is again present at input 84 of operational amplifier 82, the amplified potential difference with respect to ground 32 being detected with the aid of voltmeter 95. The electric current carried by second phase winding 26 is determined on the basis of this electric voltage and on the basis of the known inner resistance of second semiconductor switch 44. In a subsequent seventh work step 112, fifth semiconductor switch 60 is activated via its gate 66 with the aid of microprocessor 70 in such a way that it is again placed in the electrically non-conductive state. An eighth work step 114 is subsequently carried out, in which third semiconductor switch 48 is placed in the electrically conductive state.

Second semiconductor switch 44 is subsequently placed in the current-blocking state, and sixth semiconductor switch 62 is placed in the electrically conductive state with the aid of microprocessor 70, for which purpose gate 66 of sixth semiconductor switch 62 is suitably activated. The electric current conducted by third phase winding 28/third semiconductor switch 48 is thus determined. Sixth semiconductor switch 62 is subsequently again placed in the electrically non-conductive state before first semiconductor switch 40 and third semiconductor switch 48 are actuated. Fourth semiconductor switch 58 is thus carrying current only when first semiconductor switch 40 is carrying current, and fifth semiconductor switch 60 is carrying current only when second semiconductor switch 44 is carrying current. Sixth semiconductor switch 62 is also conductive only when only third semiconductor switch 48 is carrying current. The electric voltage present at input 84 of operational amplifier 82 is therefore comparatively low, and the electric current flowing over first, second or third semiconductor switch 40, 44, 48 is detected with the aid of test circuit 56.

In summary, a shuntless current measurement takes place for electric motor 14, which is designed as a brushless DC motor (BLDC). Electric motor 14 also has three motor phases. The electric current is detected only with the aid of a single amplifier circuit, which includes a single operational amplifier 82, which results in a cost and installation space reduction. A selection circuit is used for this purpose, which includes three branches 57, 59, 61 having particular assigned semiconductor switches 58, 60, 62. Fourth, fifth and sixth semiconductor switches 58, 60, 62 are designed as low-power MOSFETs. Fourth, fifth and sixth semiconductor switches 58, 60, 62, make it possible to select the individual motor phases individually. Thus, only one of the phase currents is amplified with the aid of operational amplifier 82 and determined with the aid of voltmeter 95. A filtering takes place based on ohmic resistors 65, fourth resistor 90 as well as capacitors 92, to avoid saturating operational amplifier 82. An overvoltage protection is also provided with the aid of zener diode 94.

The invention is not limited to the exemplary embodiment described above. Instead, other variants of the invention may be derived herefrom by those skilled in the art without going beyond the subject matter of the invention. Moreover, in particular, all individual features described in connection with the exemplary embodiment may also be otherwise combined with each other without going beyond the subject matter of the invention.

What is claimed is:

1. A brushless electric motor of a motor vehicle or an ancillary unit, the electric motor comprising:

a first phase winding connected in series to a first semiconductor switch;

a second phase winding connected in series to a second semiconductor switch;

a third phase winding connected in series to a third semiconductor switch, and a test circuit connected in parallel to the first semiconductor switch, the second semiconductor switch and the third semiconductor switch, wherein the test circuit includes a first branch having a fourth semiconductor switch, a second branch having a fifth semiconductor switch and a detection circuit, the first semiconductor switch being bridged with the aid of the first branch and the detection circuit, and the second semiconductor switch being bridged with the aid of the second branch and the detection circuit.

2. The brushless electric motor according to claim 1, wherein the first semiconductor switch and the second semiconductor switch are fed back to a shared reference potential or to ground.

3. The brushless electric motor according to claim 1, wherein the detection circuit includes an operational amplifier having an input, the input of the operational amplifier being fed back to the first branch and to the second branch.

4. The brushless electric motor according to claim 3, wherein a voltage limiter or a zener diode and/or a capacitor is/are connected in parallel to the operational amplifier.

5. The brushless electric motor according to claim 1, wherein the first branch and/or the second branch has/have an ohmic resistor.

6. The brushless electric motor according to claim 1, wherein a gate of the fourth semiconductor switch is electrically contacted with a gate of the first semiconductor switch, and/or a gate of the fifth semiconductor switch is electrically contacted with a gate of the second semiconductor switch.

7. A method for operating a brushless electric motor according to claim 1, the method comprising:

actuating the fourth semiconductor switch only when the first semiconductor switch is carrying current; and/or actuating the fifth semiconductor switch only when the second semiconductor switch is carrying current.

8. A drive train actuator comprising:

a gear selector lever; and the brushless electric motor according to claim 1.

9. The brushless electric motor according to claim 1, further comprising a first auxiliary semiconductor switch connected in series to the first semiconductor switch and a second auxiliary semiconductor switch connected in series to the second semiconductor switch.

10. The brushless electric motor according to claim 9, wherein the first auxiliary semiconductor switch is connected between a vehicle system potential and the first semiconductor switch and the second auxiliary semiconductor is connected between the vehicle system potential and the second semiconductor switch.

11. The brushless electric motor according to claim 3, wherein a zener diode and two capacitors are provided in the detection circuit and are connected in parallel to the operational amplifier.

12. The brushless electric motor according to claim 3, wherein an output of the operational amplifier is connected to a voltmeter and to two resistors, wherein the two resistors are connected in series and the voltmeter is connected in parallel to the two resistors.

13. The brushless electric motor according to claim 5, wherein the ohmic resistor is connected between the first semiconductor switch and the fourth semiconductor switch or the ohmic resistor is connected between the second semiconductor switch and the fifth semiconductor switch.

* * * * *